United States Patent [19]

Sepesy

[11] Patent Number: 4,803,415
[45] Date of Patent: Feb. 7, 1989

[54] STEPPER MOTOR CONTROL CIRCUIT AND APPARATUS

[75] Inventor: Paul A. Sepesy, Youngstown, Ohio

[73] Assignee: Commercial Shearing, Inc., Youngstown, Ohio

[21] Appl. No.: 106,059

[22] Filed: Oct. 7, 1987

[51] Int. Cl.⁴ .............................................. H02P 8/00
[52] U.S. Cl. .................................. 318/696; 318/685; 180/140; 91/49
[58] Field of Search ............... 318/696, 685; 180/140, 180/142; 91/49

[56] References Cited

U.S. PATENT DOCUMENTS

| | | | |
|---|---|---|---|
| 4,245,547 | 1/1981 | Reynolds | 91/49 |
| 4,612,588 | 9/1986 | Tsukahara | 360/78 |
| 4,626,758 | 12/1986 | Takeuchi et al. | 318/603 |
| 4,703,244 | 10/1987 | Takeuchi et al. | 318/696 |
| 4,706,456 | 11/1987 | Backe et al. | 60/368 |
| 4,718,514 | 1/1988 | Hirakuchi | 180/142 |
| 4,724,372 | 2/1988 | Takeuchi et al. | 318/685 |

*Primary Examiner*—William M. Shoop, Jr.
*Assistant Examiner*—Saul M. Bergmann
*Attorney, Agent, or Firm*—Buchanan Ingersoll

[57] ABSTRACT

The present invention relates to a motor control circuit for a stepper motor which causes a motor shaft to oscillate between an incremental rotational position nearest above and nearest below a commanded average rotational position identified by an electrical command signal. A clock is provided for sending periodic clock signal pulses to the control circuit. An up/down counter is connected to the clock for counting clock pulses on each clock cycle and for providing an output signal in the form of a binary representation of total clock pulses. A comparing circuit electrically connected to the up/down counter is used to control an up/down direction of the up/down counter before each clock signal pulse so that the up/down counter causes the motor shaft to rotate to a position nearest beyond the commanded shaft position and to thereafter oscillate between an incremental count nearest above and an incremental count nearest below the commanded average rotational position. The invention provides the benefit of greater average shaft position resolution and, additionally, because oscillation is provided, the present invention is particularly useful in the electrical positioning of valve spools or variable displacement pumps in a manner which reduces the possibility of spool sticking.

26 Claims, 7 Drawing Sheets

STEPPER MOTOR CONTROL CIRCUIT AND APPARATUS

BACKGROUND OF THE INVENTION

1. Field of the Invention

The present invention relates to a motor control circuit and apparatus which may be adapted, for example, to provide proportional positioning of a valve spool or variable displacement pump in response to an electrical command signal. More specifically, the present invention relates to a motor control circuit which causes a motor shaft to oscillate between an incremental rotational position nearest above and nearest below a commanded average rotational position identified by an electrical command signal.

2. Background of the Prior Art

Electronic remote operation of valves and variable volume piston pumps has been used for many years. Traditionally, electrical positioning of valve spools has been obtained by providing a pilot pressure line to one end of a spool from a pressure control pilot valve that electrically varies the pressure exiting the pilot valve. The force on the one end of the spool acts against a spring force in the opposite direction thus making the spool position proportional to the pressure. Alternatively, two pilot pressures operating on opposite ends of the spool may be used so that the net pressure force acts against a centering spring.

A number of methods have been used for electronically varying the pressure on the end of the spool. For example, the use of a permanent magnet torque motor to operate a nozzle flapper pilot stage or a jet deflector pilot stage has been practiced. Yet another method utilizes two proportional or pulse width modulated solenoids, each of which controls the pressure on an end of the spool. Finally, the use of a push-pull arrangement of solenoids to mechanically move a small pilot spool which directs pressure to opposite ends of the main valve spool has been used Each of these methods provides a theoretical balance of net pressure forces generated by the pilot valves on opposite end areas of the spool against a spring force that acts to center the spool. In practice, however, this pressure-spring balance is greatly influenced by fluid flow forces, friction of the spool in the housing, the drag of seals and frictional forces of associated components.

As a result, the positioning forces of the spring and pressures must be made very high compared to the frictional and flow forces so that the basic spool position is determined by positioning forces (pressure forces versus spring forces) and not the unwanted forces (friction and flow forces). Because of constraints in springs and space limitations, the compromises which must be made result in devices which typically have 15% hysteresis (due to friction) and 25% non-linearity (due to flow forces).

To avoid undesirable uncertainties in spool position, various schemes to feed back the spool position to the pilot valve have been employed to increase positional pressure gain and thus reduce hysteresis and non-linearity. Both mechanical and electrical feedback devices are currently in use.

Mechanical feedback operates by providing some sort of spring force feedback of the main valve spool position to the pilot stage. Because of pilot stage output force limits the magnitude of this spring force this method does not provide much of a safety margin. Additionally, because the spring also utilizes some or most of the force required in the pilot stage, the pilot stage must be made larger (higher output force).

Electrical feedback may be accomplished with a potentiometer, strain gage, LVDT or other position transducer used to yield an electrical signal proportional to spool position. This type of feedback greatly increases the pressure gain to position the spool but has a major limitation in that the loss of the feedback signal for even a short time will force the main valve spool to its full flow position and electrical position transducers add to the overall cost of the system.

In summary, the existing devices and methods utilized for the electrical positioning of valve spools which do not utilize feedback are plagued with problems of hysteresis and repeatability. Those devices and methods which use feedback of main valve spool position may be unacceptable for many applications because of a lack of fail safe back-up systems to address the problems associated with the possible loss of the feedback signal.

SUMMARY OF THE INVENTION

The present invention provides a solution to the problems associated with the electrical positioning of valve spools or variable displacement pumps by utilizing a stepper motor and motor control circuit. The present invention does not rely on feedback to determine the position of the main valve spool and is accordingly more fail safe than existing devices which use feedback. Further, the use of a stepper motor removes the repeatability and hysteresis problems associated with existing electrical open loop positioning devices for valve spools and the like.

In its broadest sense, the motor control circuit and apparatus of the present invention is adapted for controlling an electrical motor having a rotatable shaft adapted to rotate incrementally clockwise or counterclockwise in response to electrical currents applied to the motor. The circuit and apparatus includes input means including command signal input means for receiving an electrical command signal and power input means for receiving a sufficient electrical current to energize the control circuit and motor.

As part of the control circuit, a clock means in the form of any timing device is utilized for providing periodic electrical clock signal pulses to the control circuit.

An up/down counter means is electrically connected to the clock means for receiving and counting clock pulses and then providing an output signal in the form of a binary representation of total clock pulses. Comparing circuit means electrically connected to the up/down counter means and to the command signal input means is utilized for determining the up/down direction of the up/down counter before each clock signal pulse so that the up/down counter counts in a single direction until the binary representation of total counts is equivalent to an incremental count nearest beyond the input command signal. The direction of the up/down counter is then reversed until it reaches the incremental count nearest below said input command, and again reverses. Thereafter the control output oscillates between an incremental count nearest above and an incremental count nearest below said input command signal.

Decoder means is connected to the up/down counter and is adapted to be connected to the motor for transmitting electrical currents to the motor to cause the motor shaft to oscillate in synchronization with the control circuit about a commanded average rotational position corresponding to the binary representation of total counts of the up/down counter.

The control circuit and apparatus of the present invention may be used with any type of motor which has a shaft adapted to rotate to a plurality of incremental shaft positions. Preferably, a stepping motor having a first and a second motor winding is utilized in combination with an up/down counter means which includes a binary up/down counter having at least an 8-bit binary output. When at least an 8-bit binary output is provided, the decoder means decodes three bits of the output signal from the up/down counter means to provide eight possible combinations of positive, negative and zero currents to the windings. It is noted that the magnitude of a positive or negative current applied to the windings remains constant.

In a first operational condition where an input command signal is provided to the circuit to select a commanded rotational shaft position which falls between two actual incremental positions of the stepping motor, the control circuit causes the shaft to rotationally oscillate between the two incremental positions creating an average rotational position equal to the commanded position. During such a condition, for example, the first winding may remain at a constant current value and the second winding may be adapted to oscillate between a zero current value and either a positive or a negative value.

In a second operational condition where an input command signal is provided to select a commanded rotational shaft position which is equal to an actual incremental position of the stepping motor, the control circuit causes the shaft to rotate between a position above the commanded position, the commanded position and a position below the commanded position creating an average rotational position equal to the commanded position. In order to accomplish this, for example, an appropriate combination of currents is provided to both windings on alternate clock cycles to cause the shaft to rotate to the commanded rotational shaft position On a first opposite alternate clock cycle current to the first winding is altered and on a second opposite alternate clock cycle the current to the second winding is altered.

The motor control circuit and apparatus of the present preferably includes short circuit protection means for turning off the electrical currents from the decoder means when such currents exceed a predetermined level. Such a short circuit protection means may be formed with a combination of resistors, diodes and a silicon controlled rectifier.

The up/down counter of the present invention preferably has an electrical dead band range of total counts located approximately midway between a minimum count and a maximum count of the up/down counter means. The decoder means of the present invention may also include a synchronization means for turning off the electrical currents to the motor when the up/down counter passes through the electrical dead band. The short circuit protection means and the synchronization means of the present invention may be used in combination with a motor which includes a centering means to return the motor shaft to a preselected rotational position whenever the motor windings are turned off. The motor centering means preferably includes at least one spring.

As indicated above, the motor control circuit and apparatus of the present invention has particular utility in the control of a valve positioner in the form of a hydraulic assist means controlled by rotation of the motor shaft. In a preferred embodiment of the invention, the hydraulic assist means includes a follow-up servo means which includes a spool, having at least one helical land, adapted for rotation by the shaft with the spool rotation causing linear motion of a piston of the follow-up servo. The hydraulic assist means may be utilized to provide proportional positioning of a valve spool or a variable displacement pump.

As an example, the control circuit and apparatus of the present invention may include a hydraulic assist means which controls a valve having a housing and a flow control member, the movement of which controls fluid flow rate within a metering range of the valve. The valve also has a valve dead band range where no change in fluid flow is caused by movement of the flow control member. When the control circuit and apparatus of the present invention is utilized to control such a valve, the up/down counter preferably has at least one low gain range and at least one high gain range within the range of total counts which correspond, respectively, to movement of the flow control member through the valve metering range and the valve dead band range. In this application, it may be desirable to set the clock means to the maximum rate at which the motor can respond when the up/down counter is within the high gain range of total counts. Preferably, the command signal has a non-linear relationship with respect to the binary representation of total counts such that a given command signal change causes a larger number of counts when the up/down counter is within the high gain range of total counts than when it is within the low gain range of total counts. These features of the present invention allow for maximum rate of travel of a flow control member through the dead band range of the valve and an adjustable rate through the metering range of the valve.

If desired, a safety mechanism may be provided in the form of a solenoid safety means for shutting off the flow of hydraulic fluid to the hydraulic assist means whenever the up/down counter is within the electrical dead band range of counts. It will be obvious to those skilled in the art that more than one motor control circuit and apparatus can be protected by a single solenoid safety means adapted for use in protecting a plurality of hydraulic assist means which are connected to a common pressure source.

As a convenience device, the motor control circuit and apparatus of the present invention may also include a clock stop means for stopping the clock means and freezing the position of the up/down counter. When the motor control circuit and apparatus is connected to a hydraulic assist means and a valve, the clock stop means freezes the position of the up/down counter, the hydraulic assist means and the flow control member; thereby providing an electrical detent at any position of the flow control member.

Finally, the motor control circuit and apparatus according to the present invention preferably includes reset means for resetting the up/down counter to a preset position during an initial power up of the control circuit. The reset means also insures that the clock is released on initial power-up from any electrical detent caused by the clock stop means. It is noted that if an SCR is not utilized in the short circuit protection means some other means of power-up resetting of the short circuit protection means would be required in the reset means.

These and other advantages and details of the present invention will be more fully understood upon reference to the accompanying drawings.

DETAILED DESCRIPTION OF THE PREFERRED EMBODIMENTS

Figure 1:
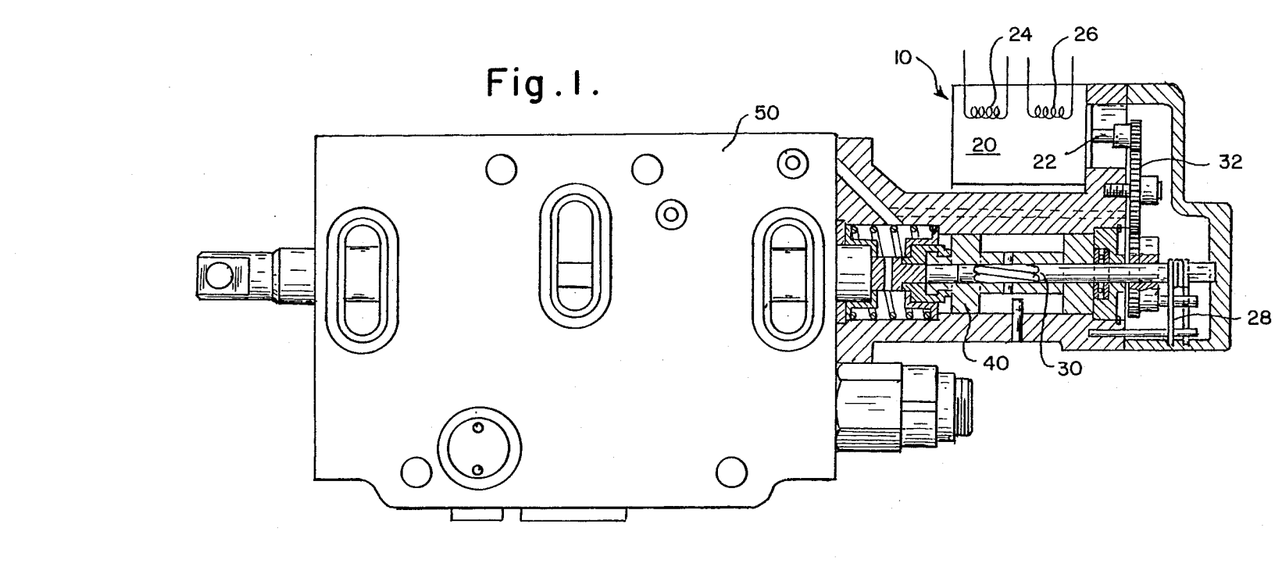
FIG. 1 is a cross sectional view of a digital valve positioner, including a stepper motor.

Referring to the drawings, there is illustrated in FIG. 1 an embodiment of a digital valve positioner 10. A stepping motor 20, including shaft 22 and two windings 24 and 26, is utilized to adjust piston 40 of positioner 10 by means of a spool 30 having a helical land. Spool 30 and piston 40 form a hydraulic force assist means. Shaft 22 is connected to rotate spool 30 by suitable gear means 32. The operation and function of one embodiment of a spool having a helical land is described in U.S. Pat. No. 4,245,547. The helical spool identified in FIG. 1 is hydraulically balanced and is adapted to move both inwardly and outwardly in response to rotation of the motor shaft 22. When electrical current to windings 24 and 26 of stepping motor 20 is shut off, shaft 22 is returned to a desired rotational position by centering means in the form of a centering spring 28. Valve positioner 10 is operably connected to valve 50.

Stepping motor 20, like all stepping motors, includes a rotor having a plurality of north and south poles created by permanent magnets. A first and a second winding are positioned to surround the rotor. Rotation o motor shaft 22 is caused by turning the first and second windings on and off and by changing the polarity of the currents to the windings. Shaft 22 rotates incrementally with the windings either aligned with the magnetic poles or midway between the points. A full step occurs when the windings move a distance equal to the distance from one magnetic pole to the next. A half step occurs when the windings move only half the distance between two magnetic poles. As used herein, the term "rotational shaft position" refers to an industry standard incremental half step position of the stepper motor shaft 22.

The motor control circuit and apparatus of the present invention provides an effective means to provide an average shaft rotational position which, accordingly, effectively increases the resolution of stepper motor 20. It is to be understood, however, that the motor shaft 22 is in constant motion and is adapted to rotate one incremental position on each clock signal pulse provided by a clock means as will be hereinafter described. It is noted that the control circuit and apparatus of the present invention does not utilize a technique known as "microstepping" to increase the total number of actual shaft positions by altering the magnitude as well as the polarity of the current applied to the windings. Rather, in the present invention the absolute value of the current when applied to the windings of motor 20 is maintained at a constant magnitude.

Because the motor shaft 22 is adapted to oscillate above and below a commanded average rotational shaft position, the present invention effectively provides greater resolution in the rotational position of the shaft. Further, because use of the present invention results in constant oscillation or movement of shaft 22, it also provides the same benefits commonly associated with dither.

Operation of the control circuit of the present invention will be explained upon reference to FIGS. 2 through 6. As illustrated in FIGS. 5a through 5d, the control circuit of the present invention is assembled by the interconnection of a number of standard off the shelf electrical components. These components are designated below.

Counter U1 is a binary up/down counter (Part No. MC14516BCP) Decoder U2 is a BCD to decimal decoder (Part No. MC14028BCP). "Or" gates U3A, U3B and U3C are each triple 3-input "or" gates (Part No. MC14075BCP). "Nor" gates U4A, U4B and U4C are each triple 3-input "nor" gates (Part No. MC14025BCP). "And" gates U5A, U5B, U5C and U5D are each quad 2-input "and" gates (Part No. MC14081BCP). Flip-flop U6 is a dual type D flip-flop (Part No. MC14013BCP) Counter U7 is a binary up/down counter (Part No. MC14516BCP). Op amps U8A, U8B, U8C and U8D are each operational amplifiers of a quad operational amplifier (Part No. LM324N) "Nor" gates U9A, U9B and U9C are each 3-input "nor" gates which form a triple 3-input "nor" gate (Part No. MC14025BCP). "And" gates U10A, U10B and U10C are each triple 3-input "and" gates (Part No. MC14073BCP). Inverters U11A through U11F are each inverters which form a hex inverter (Part No. MC14069UBCP). Op amps U12A, U12B, U12C and U12D are each operation amplifiers which form a quad operational amplifier (Part No. LM324N). Flip-flop U13 is a dual type D flip-flop (Part No. MC14013BCP). Switches U14A, U14B, U14C and U14D are each analog switches which form a quad analog switch (Part No. MC14016BCP) Finally, clocks U15A and U15B are each timers which form a dual timer (Part No. NE556N).

SCR1 is a silicon controlled rectifier (Part No. 2N5062). Transistors Q1, Q3, Q5, Q7, Q9 and Q10 are each PNP power transistors. Metal oxide field effect transistors (Mosfets) Q2, Q4, Q6, and Q8 are each N-channel power mosfets and transistors Q11 through Q17 are each NPN transistors. Components CR1 through CR13 are each diodes and CR14 is a zener diode. C1 through C30 are capacitors and R1 through R61 are resistors. RP1 and RP2 are each cermet resistor networks and VR1, VR2 and VR3 are each multi-turn cermet pots.

External connections may be made to the circuit at a number of locations as described below. Positive power is applied to input designated K(13,14) and the power ground is applied to the inputs designated L(15), N and M(16). A signal ground is provided to inputs P(19) and Q(20). A pot centertap input is provided at D(4) and pot power and switch power inputs are provided respectively at H(9) and I(10). A pressure on/off output is provided at A(1). A detent set/release input is provided at E(5), a detent auto release is provided at G(8) and a detent lamp on/off is an output provided at B(2). Finally, an input command signal is provided at input means C(3).

The power supply means of the present invention (not shown) preferably provides between 12 and 15 volts of D.C. current and is connected between positive power input K(13,14) and power ground inputs L(15), N, M(16). The clock means of the present invention includes chips U15A together with associated components U14A, U14D, R44, R32, R31, VR3, C9 and C11. The up/down counter means of the present invention includes chips U1 and U7.

The comparing means of the present invention includes one of the flip-flops of U13 as well as components R24, R25, U12A, CR5, CR9, R28, R29, R30, U12B and UF11. The input means of the present invention consists of input C(3).

The short circuit protection means of the present invention consists of components CR11, CR12, SCR1, R55, R56, and C4.

The solenoid safety means of the present invention consists of components R20, Q15, R5, R14, Q9, CR6, and CR7.

The clock stop means of the present invention which in the preferred embodiment includes an indicator lamp is formed of components C13, R53, the other flip-flop of U13, R58, C5, U4B, R60, R61, C6, R21, Q16, R6, R15, and Q10.

The reset means of the present invention which is connected to the up/down counter preset enable and is utilized to release any detent caused by the clock stop means consists of components CR10, R45, R46, C12 and U14B.

The remaining components illustrated in FIGS. 5a through 5d are all a part of the decoding means of the present invention. Within the decoding means synchronization means is provided which includes components U10A, U11A, U11B, U9C, U10C, U11C, U9A, U9B, U11D, U11E, U10B and a D input of U2 which acts as an enable of U2.

Figure 2:
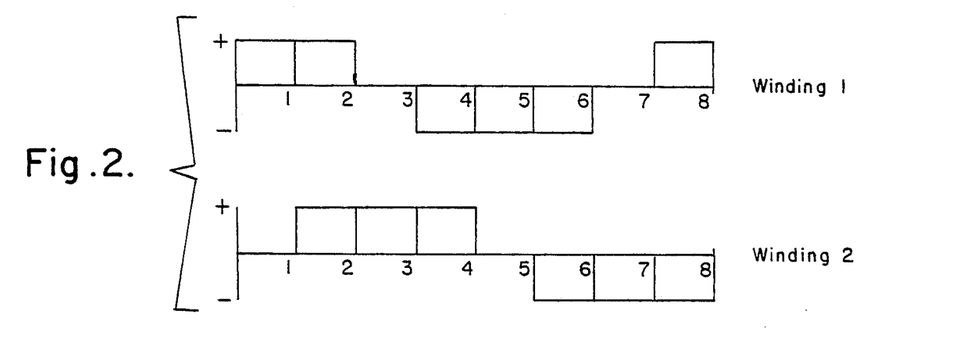
FIG. 2 illustrates a normal 8-step sequence of currents provided to a first and second motor winding which causes incremental shaft rotation in a single direction.

The operation of the control circuit of the present invention will now be briefly described. The normal stepping sequence of the circuit is decoded by chip U2, which causes half steps. Referring to FIG. 2, the currents applied to winding 1 and to winding 2 are illustrated on each of a normal 8-count stepping sequence. As shown, during a normal stepping sequence each winding has a positive current for three counts, a negative current for three counts and zero current for two counts. By repeating this 8-step sequence of current values to the motor windings, shaft 22 is caused to incrementally rotate in half steps in a single rotational direction. The half steps are decoded from the three least significant bits inputted into chip U2 from the up/down counter means formed by chips U1 and U7. The least three significant bits are those that can operate the fastest or change the quickest. A first input (A) of U2 is adapted to change with every clock pulse, a second input (B) is adapted to change on every other clock pulse and a third input (C) is adapted to change on every fourth clock pulse. The combination of these three inputs provide an octal count from 0 to 7 causing the half steps. Chip U2 decodes the least three significant bits to one of eight outputs which are then encoded back into four lines. When the up/down counter means is running steady, the output of the encoder is on for three counts and off for five. Each of the outputs from the encoder (U3A, U3B, U3C, U4A and U4C) are fed into half of a bridge, which is electrically connected to either winding 1 or winding 2 of stepper motor 20.

Figure 3:
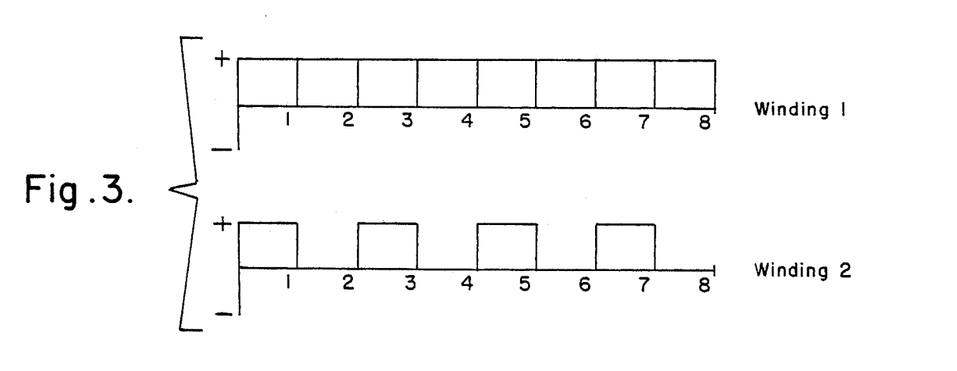
FIG. 3 illustrates one possible sequence of currents provided to a first and second motor winding where a commanded average shaft position is halfway between two incremental shaft positions of the motor.

As indicated above, the windings of stepper motor 20 may have either a positive or negative voltage applied with an off time in between. Any time a winding goes from a positive to a negative voltage there will be a time period in between when the winding has no voltage. FIG. 3 illustrates one possible combination of currents applied to winding 1 and to winding 2 in an operational condition where a desired average shaft rotational position is midway between two incremental shaft positions of stepper motor 20. In this example, winding 1 is maintained at a constant positive current while winding 2 oscillates between a positive current and zero current. In this operational condition once shaft 22 has rotated to the incremental step nearest beyond the desired average rotational position, the up/down counter means repeats up, down, up, down counts causing shaft 22 to rotate between two adjacent steps, creating an average rotational position equal to the desired position.

Figure 4:
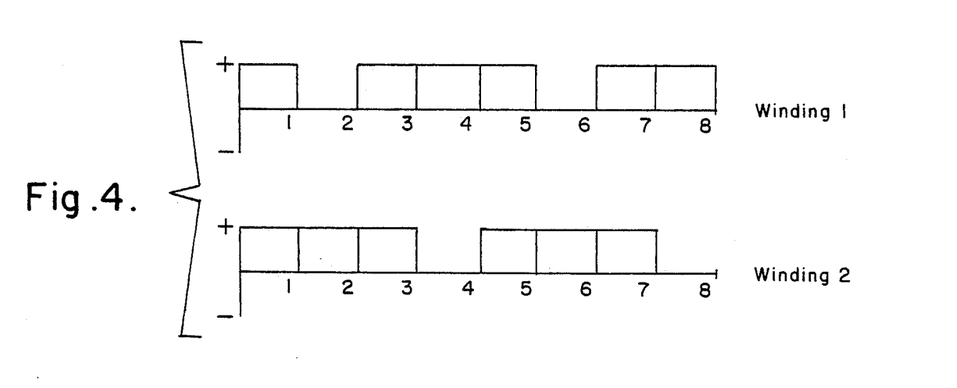
FIG. 4 illustrates one possible sequence of currents provided to a first and second winding where a commanded average shaft rotation is equal to an incremental shaft position of the motor.
Figure 5A:
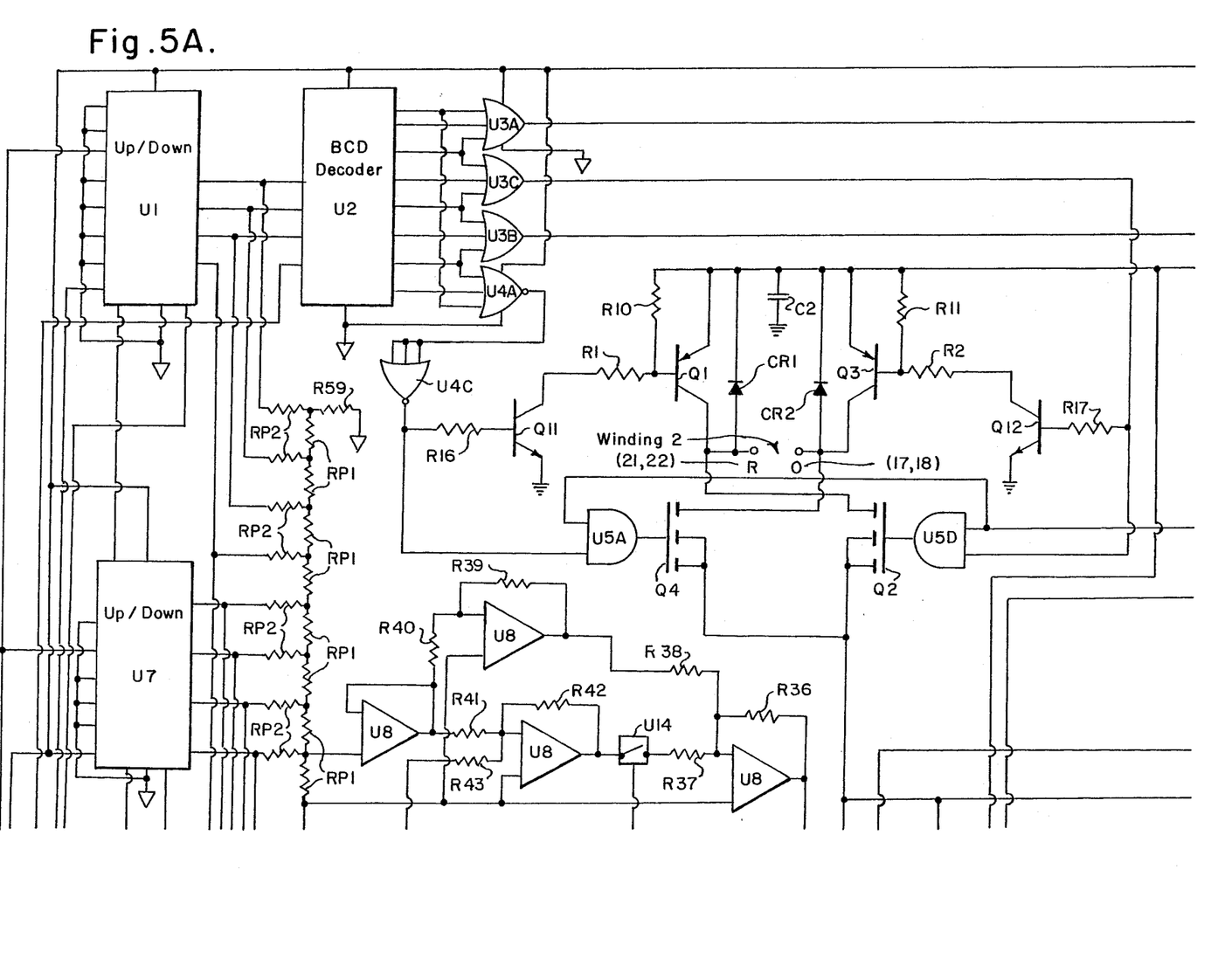
FIGS. 5a through 5d are a circuit diagram of the control circuit of the present invention.
Figure 5B:
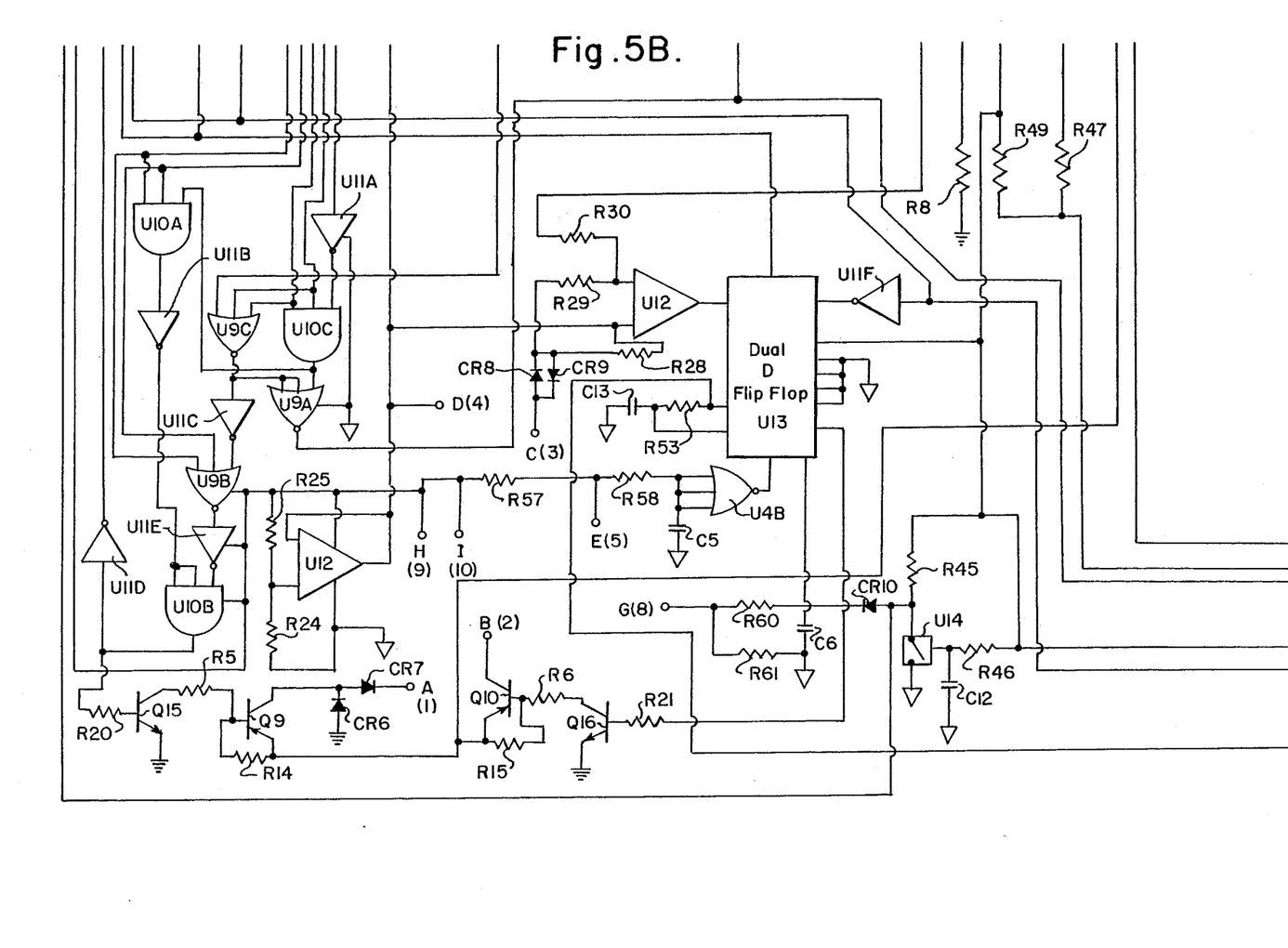
Figure 5C:
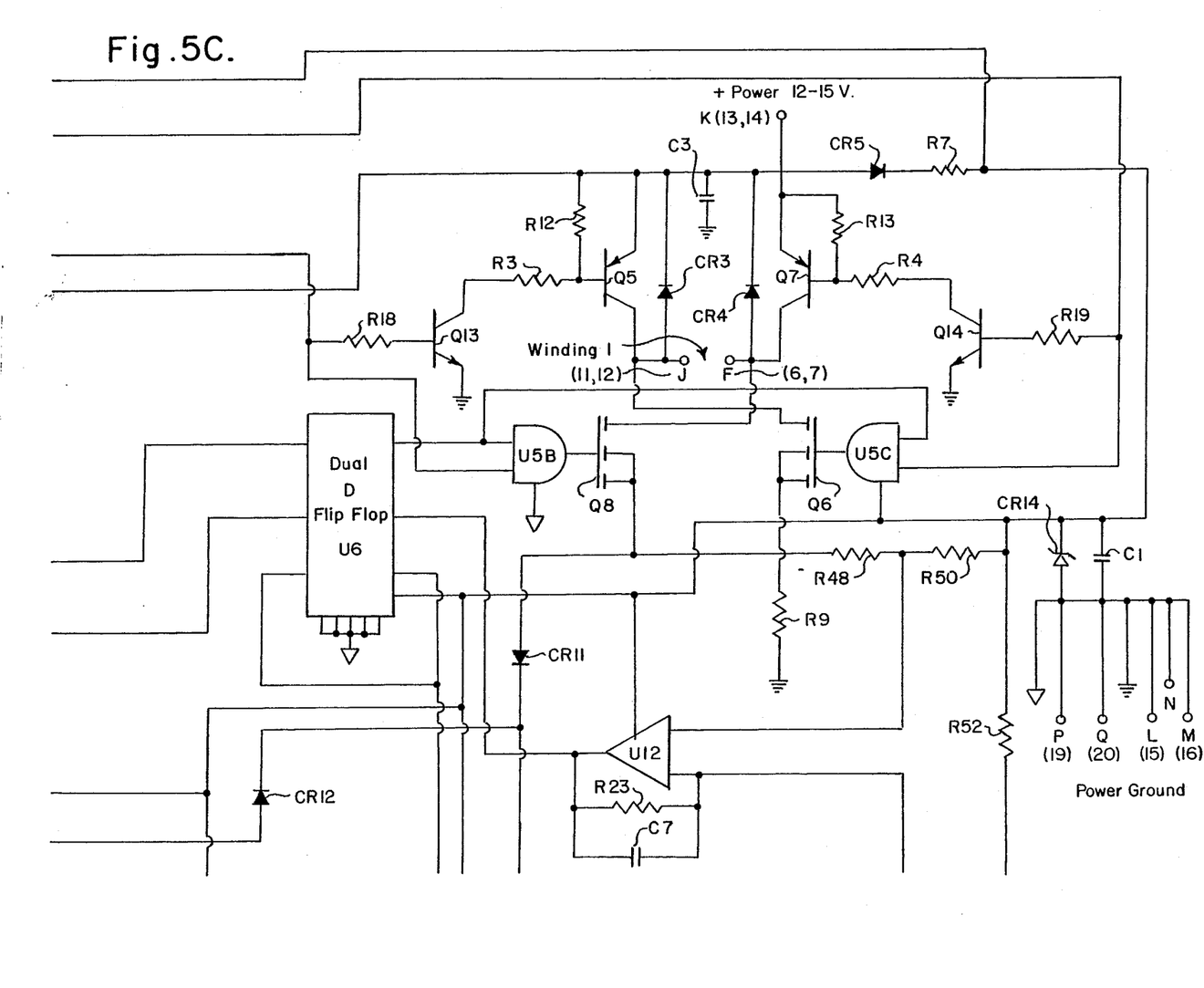
Figure 5D:
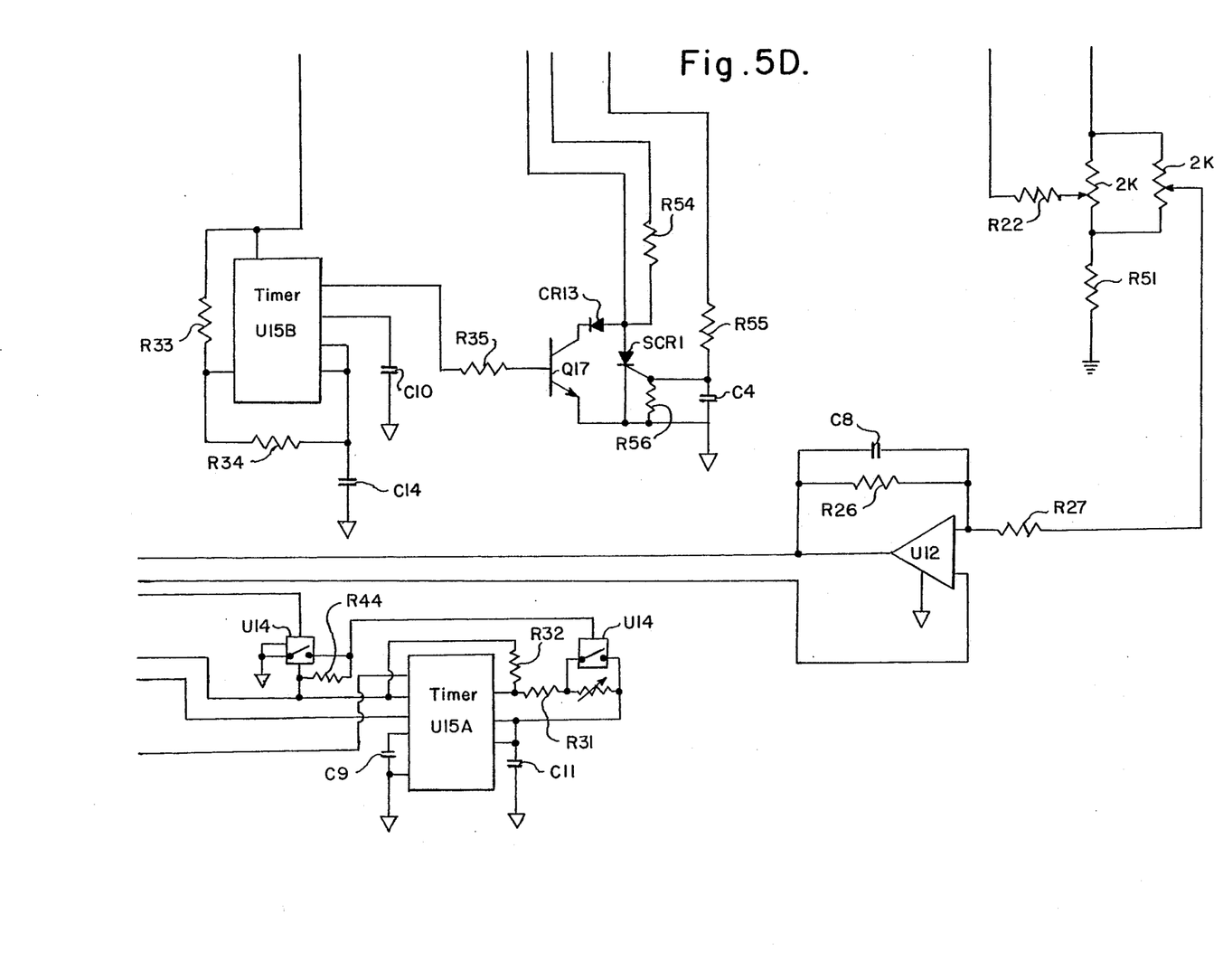

FIG. 4 illustrates one possible combination of currents applied to winding 1 and to winding 2 in an operational condition where a desired average rotational position is equal to one of the actual incremental shaft positions provided by stepper motor 20. In this operational condition, once the shaft rotates to an incremental position nearest beyond the desired average rotational position, the stepper motor causes the shaft to rotate between a position above the commanded position, the commanded position and a position below said commanded position, creating an average rotational position equal to the commanded position. To accomplish this an appropriate combination of currents is provided to both windings, in this case both positive, on alternate clock cycles 1, 3, 5 and 7 to cause the shaft 22 to actually rotate to the desired rotational shaft position. On a first opposite alternate clock cycle 2, the current to the first winding is altered from a positive current to zero current and on a second opposite alternate clock cycle 4, the current to the second winding is altered from a positive current to zero current. In this operational condition, the up/down counter repeats a pattern of up, up, down, down counts causing the current pattern illustrated in FIG. 4.

It will be obvious to those skilled in the art that it may be possible to provide an average rotational shaft position having a resolution less than quarter steps as provided by the preferred embodiment illustrated and described above. This may be accomplished in some circumstances by merely altering the pattern of currents applied to the first and second windings, or, in other circumstances, by causing the shaft to oscillate to positions beyond those nearest above and/or nearest below the commanded average rotational position.

Figure 6:
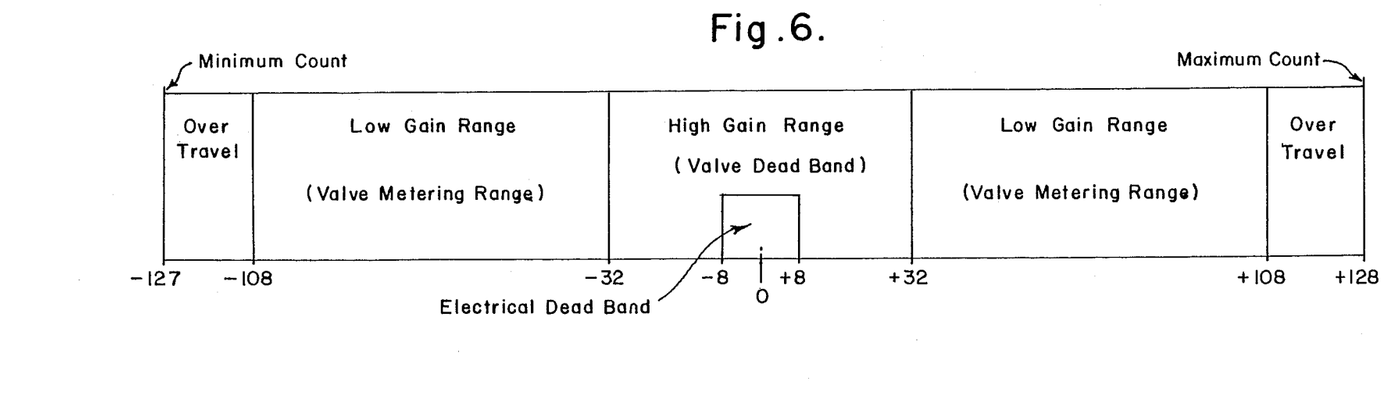
FIG. 6 graphically illustrates the relative position of various ranges of counts of the up/down counter means of the present invention.

FIG. 6, graphically illustrates that the up/down counter means of the present invention is adapted to include a low gain range of counts, a high gain range of counts and an electrical dead band range of counts. As shown, an electrical dead band range of counts (−8 to +8) is provided approximately midway between a minimum count of −127 and a maximum count of 128. The electrical dead band range is included in a high gain range of counts (−32 to +32) which corresponds to motion of a flow control member through a valve dead band. On opposite sides of the high gain range are low gain ranges of counts (−108 to −33 and +33 to +108) which correspond to motion of a flow control member through a valve metering range. Overtravel ranges of counts (−127 to −109 and +109 to +128) may be provided to insure full travel through the metering range. The zero count of the counter means illustrated in FIG. 6 corresponds to a spring centered position of the stepper motor shaft.

Figure 7:
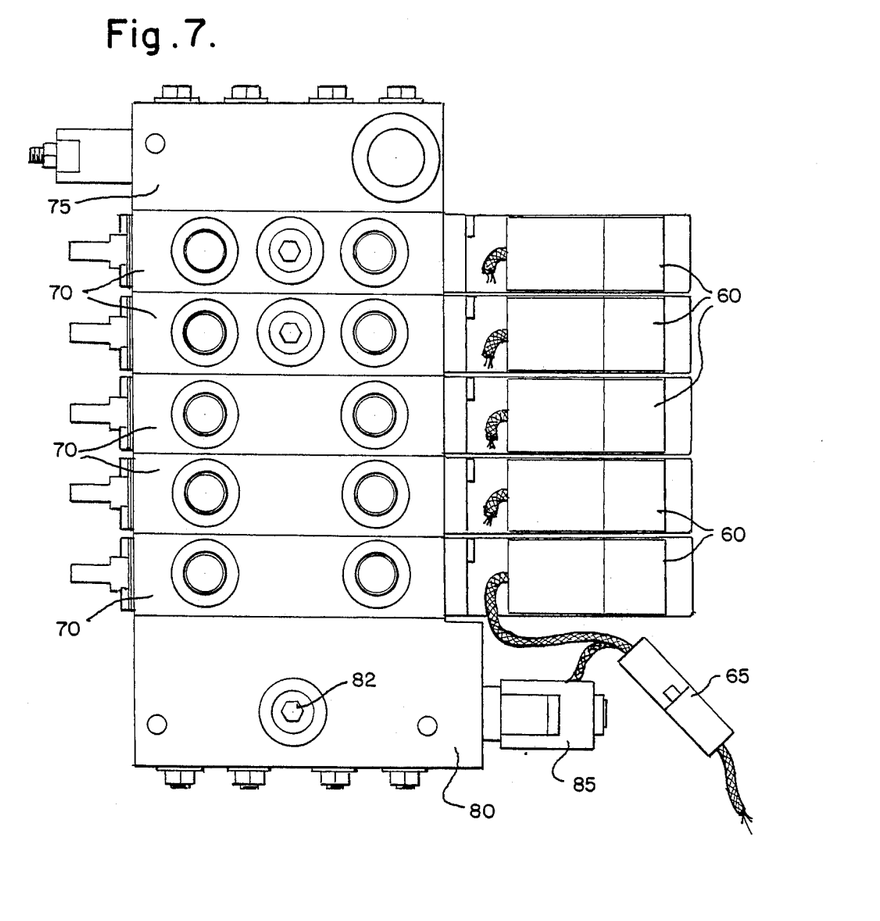
FIG. 7 is a side elevational view showing a plurality of valve sections operated by a single pressure source.

Finally, FIG. 7 illustrates that with the control circuit of the present invention a plurality of valve positioners 60 may be operated by a single pressure source input 82. Positioners 60 operate plurality of valve sections 70 having a common inlet section 75 and a common outlet section 80. A solenoid safety means 85 is connected to and receives power from each of a plurality of controllers 65. With this arrangement, only a single solenoid safety means 85 is required. A separate controller 65 is provided for each valve positioner 60.

While I have described the presently preferred embodiment of the present invention, it is to be distinctly understood that the invention is not limited thereto and may be otherwise variously practiced within the scope of the following claims.

I claim:

1. A motor control circuit and apparatus for controlling an electrical motor having a rotatable shaft adapted to rotate incrementally clockwise or counterclockwise in response to electrical currents applied to the motor comprising:
   (a) input means including command signal input means for receiving an electrical command signal and power input means for receiving a sufficient electrical current to energize the control circuit and motor;
   (b) clock means for providing periodic electrical clock signal pulses to the control circuit;
   (c) up/down counter means electrically connected to said clock means for counting clock pulses on each clock signal pulse and for providing an output signal in the form of a binary representation of total clock pulses;
   (d) comparing circuit means electrically connected to the up/down counter means and to the command signal input means for determining an up/down direction of the up/down counter before each clock signal pulse so that the up/down counter counts in a single direction until the binary representation of total counts is equivalent to an incremental count nearest beyond the input command signal and thereafter oscillates between an incremental count at least one count nearest above and an incremental count at least one count nearest below said input command signal; and
   (e) decoder means connected to the up/down counter and adapted to be connected to the motor for transmitting electrical currents to the motor to cause the shaft to rotate to and oscillate about a commanded average rotational position responsive to the binary representation of total counts of the up/down counter.

2. A motor control circuit and apparatus according to claim 1 wherein said motor is a stepping motor having a first and a second motor winding.

3. A motor control circuit and apparatus for controlling an electrical motor having a rotatable shaft adapted to rotate incrementally clockwise or counterclockwise in response to electrical currents applied to the motor comprising:
   (a) input means including command signal input means for receiving an electrical command signal and power input means for receiving a sufficient electrical current to energize the control circuit and motor;
   (b) clock means for providing periodic electrical clock signal pulses to the control circuit;
   (c) up/down counter means electrically connected to said clock means for counting clock pulses on each clock signal pulse and for providing an output signal in the form of a binary representation of total clock pulses wherein said up/down counter means includes a binary up/down counter having at least an 8-bit binary output;
   (d) comparing circuit means electrically connected to the up/down counter means and to the command signal input means for determining an up/down direction of the up/down counter before each clock signal pulse so that the up/down counter counts in a single direction until the binary representation of total counts is equivalent to an incremental count nearest beyond the input command signal and thereafter oscillates between an incremental count at least one count nearest above and an incremental count at least one count nearest below said input command signal; and
   (e) decoder means connected to the up/down counter and adapted to be connected to the motor for transmitting electrical currents to the motor to cause the shaft to rotate to and oscillate about a commanded average rotational position responsive to the binary representation of total counts of the up/down counter.

4. A motor control circuit and apparatus according to claim 3 wherein said decoder means decodes three bits of the output signal from the up/down counter means to provide eight possible combinations of positive, negative and zero currents to the windings.

5. A motor control circuit and apparatus according to claim 4 wherein an input command signal provided to select a commanded rotational shaft position between two incremental positions causes the shaft to rotationally oscillate between said two positions creating an average rotational position equal to the commanded position.

6. A motor control circuit and apparatus according to claim 5 wherein the first winding remains at constant current value and the second winding oscillates between a zero current value and either a positive or negative value.

7. A motor control circuit and apparatus according to claim 4 wherein an input command signal provided to select a commanded rotational shaft position equal to an incremental position of the stepping motor causes the shaft to rotate between a position above the commanded position, the commanded position, and a position below said commanded position creating an average rotational position equal to the commanded position.

8. A motor control circuit and apparatus according to claim 7 wherein an appropriate combination of currents is provided to both windings, on alternate clock cycles to cause the shaft to rotate to a commanded rotational shaft position and on a first opposite alternate clock cycle the current to the first winding is altered and on a second opposite alternate clock cycle the current to the second winding is altered.

9. A motor control circuit and apparatus for controlling an electrical motor having a rotatable shaft adapted to rotate incrementally clockwise or counterclockwise in response to electrical currents applied to the motor comprising:
  (a) input means including command signal input means for receiving an electrical command signal and power input means for receiving a sufficient electrical current to energize the control circuit and motor;
  (b) clock means for providing periodic electrical clock signal pulses to the control circuit;
  (c) up/down counter means electrically connected to said clock means for counting clock pulses on each clock signal pulse and for providing an output signal in the form of a binary representation of total clock pulses;
  (d) comparing circuit means electrically connected to the up/down counter means and to the command signal input means for determining an up/down direction of the up/down counter before each clock signal pulse so that the up/down counter counts in a single direction until the binary representation of total counts is equivalent to an incremental count nearest beyond the input command signal and thereafter oscillates between an incremental count at least one count nearest above and an incremental count at least one count nearest below said input command signal;
  (e) decoder means connected to the up/down counter and adapted to be connected to the motor for transmitting electrical currents to the motor to cause the shaft to rotate to and oscillate about a commanded average rotational position responsive to the binary representation of total counts of the up/down counter; and
  (f) short circuit protection means for turning off the electrical currents from the decoder means when such currents exceed a predetermined level.

10. A motor control circuit and apparatus according to claim 9 wherein said short circuit protection means includes a combination of resistors, diodes and a silicon controlled rectifier.

11. A motor control circuit and apparatus according to claim 3 wherein said up/down counter means has an electrical dead band range of total counts located approximately midway between a minimum count and a maximum count of the up/down counter means.

12. A motor control circuit and apparatus according to claim 11 wherein said decoder means further comprises synchronization means for turning off the electrical currents to the motor when the up/down counter passes through said electrical dead band.

13. A motor control circuit and apparatus according to claim 3 wherein said motor includes centering means to return the shaft to a preselected rotational position whenever the motor is turned off.

14. A motor control circuit and apparatus according to claim 13 wherein said centering means includes at least one spring.

15. A motor control circuit and apparatus according to claim 11 further comprising a valve positioner including a hydraulic assist means controlled by rotation of said motor shaft.

16. A motor control circuit and apparatus according to claim 15 wherein said hydraulic assist means includes a spool having at least one helical land adapted for rotation by said shaft, said spool rotation causing linear motion of a piston.

17. A motor control circuit and apparatus according to claim 15 further comprising a valve adapted to be operated by said hydraulic assist means, said valve having a housing and a flow control member, movement of which controls fluid flow rate within a metering range of the valve, said valve also having a valve dead band range where no change in fluid flow is caused by movement of the control member.

18. A motor control circuit and apparatus according to claim 17 wherein said up/down counter has at least one low gain range and at least one high gain range of total counts which correspond, respectively, to movement of the flow control member through said valve metering range and said valve dead band range.

19. A motor control circuit and apparatus according to claim 18 wherein said clock means is set at a maximum speed to which the motor can respond when said up/down counter is within a high gain range of total counts.

20. A motor control circuit and apparatus according to claim 18 wherein said command signal has a non-linear relationship with respect to the binary representation of total counts and a given command signal change causes a larger number of counts when the up/down counter is within the high gain range of total counts than when it is within the low gain range of total counts.

21. A motor control circuit and apparatus according to claim 18 further comprising solenoid safety means for shutting off the flow of hydraulic fluid to the hydraulic assist means whenever the up/down counter is within the electrical dead band of counts.

22. A motor control circuit and apparatus according to claim 21 wherein a plurality of hydraulic assist means are connected to a common pressure source.

23. A motor control circuit and apparatus according to claim 1 wherein a valve controlled by the motor may move more rapidly through a valve dead band than when the valve is outside the valve dead band.

24. A motor control circuit and apparatus according to claim 3 further comprising clock stop means for stopping the clock means and freezing the position of the up/down counter.

25. A motor control circuit and apparatus according to claim 17 further comprising clock stop means for stopping the clock means and freezing the position of the up/down counter, the hydraulic assist means and the flow control member.

26. A motor control circuit and apparatus according to claim 3 further comprising reset means for resetting the up/down counter to a preset position during an initial power up of the control circuit.

* * * * *

UNITED STATES PATENT AND TRADEMARK OFFICE
CERTIFICATE OF CORRECTION

PATENT NO. : 4,803,415
DATED : February 7, 1989
INVENTOR(S) : PAUL A. SEPESY

It is certified that error appears in the above-identified patent and that said Letters Patent is hereby corrected as shown below:

Column 7, line 26, change "UF11" to --U11F--.

Signed and Sealed this

Twenty-fifth Day of July, 1989

Attest:

DONALD J. QUIGG

Attesting Officer

Commissioner of Patents and Trademarks